US012801755B2

(12) United States Patent
Yaron et al.

(10) Patent No.: US 12,801,755 B2
(45) **Date of Patent: *Nov. 17, 2026**

(54) TECHNIQUES FOR IDENTIFYING AND VALIDATING SECURITY CONTROL STEPS IN SOFTWARE DEVELOPMENT PIPELINES

(71) Applicant: Dazz, Inc., Palo Alto, CA (US)

(72) Inventors: Eshel Yaron, Amsterdam (NL); Tomer Schwartz, Tel Aviv (IL); Barak Bercovitz, Even-Yehuda (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/783,898

(22) Filed: Jul. 25, 2024

(65) Prior Publication Data

US 2024/0378299 A1 Nov. 14, 2024

Related U.S. Application Data

(63) Continuation of application No. 17/664,315, filed on May 20, 2022, now Pat. No. 12,086,266.

(51) Int. Cl.
*G06F 15/16* (2006.01)
*G06F 9/54* (2006.01)
(Continued)

(52) U.S. Cl.
CPC ........ *G06F 21/577* (2013.01); *G06F 11/3089* (2013.01); *G06F 11/3672* (2013.01); *G06F 11/3698* (2025.01)

(58) Field of Classification Search
CPC ............... G06F 21/577; G06F 11/3089; G06F 11/3664; G06F 11/3672; G06F 8/75; G06F 11/3604
(Continued)

(56) References Cited

U.S. PATENT DOCUMENTS 6,028,999 A * 2/2000 Pazel .................. G06F 11/3698 714/38.14
6,807,548 B1 10/2004 Kemper
(Continued)

FOREIGN PATENT DOCUMENTS

CN 116702160 A * 9/2023 ........... G06F 21/577
ES 2923100 T3 * 9/2022 ............... G06F 8/77
WO WO-2017181286 A1 * 10/2017 ............... G06N 7/01

OTHER PUBLICATIONS

International Search Report for PCT/IB2023/054846, dated Aug. 15, 2023. International Searching Authority Israel Patent Office Jerusalem, Israel.

(Continued)

*Primary Examiner* — Hamza N Algibhah
(74) *Attorney, Agent, or Firm* — M&B IP Analysts, LLC

(57) ABSTRACT

Systems and methods for identifying security control steps in software development pipelines. A method includes enumerating a plurality of steps in a software development infrastructure by analyzing software development pipeline data of the software development infrastructure, wherein each step includes a set of computer instructions for performing at least one task; identifying a plurality of step properties for each of the plurality of steps in step data of the step; and classifying at least one of the plurality of steps as a security control step based on the plurality of step properties identified for each of the plurality of steps, wherein each step classified as a security control step includes instructions for at least analyzing code in order to determine whether at least one security requirement is met.

15 Claims, 5 Drawing Sheets

(51) Int. Cl.

| | |
|---|---|
| ***G06F 11/30*** | (2006.01) |
| ***G06F 11/3668*** | (2025.01) |
| ***G06F 11/3698*** | (2025.01) |
| ***G06F 21/57*** | (2013.01) |
| ***H04L 29/06*** | (2006.01) |

(58) Field of Classification Search
USPC ............................................................ 726/22
See application file for complete search history.

(56) References Cited

U.S. PATENT DOCUMENTS 7,284,274 B1 10/2007 Walls et al.
7,340,469 B1 3/2008 Alghathbar et al.
7,640,533 B1 12/2009 Lottero et al.
8,806,456 B2 * 8/2014 Gazzillo ................. G06F 8/423 717/142
8,813,234 B1 * 8/2014 Bowers ................. G06F 21/552 726/25
9,792,443 B1 * 10/2017 Sheridan ............... G06F 21/563
9,830,146 B2 11/2017 Rector et al.
9,921,942 B1 * 3/2018 Makohon .............. G06F 16/285
10,564,945 B2 * 2/2020 Dong ........................ G06F 8/42
10,613,970 B1 4/2020 Jammula et al.
10,621,077 B2 * 4/2020 Wiener ...................... G06F 8/71
10,956,574 B2 * 3/2021 Conikee ................ G06F 21/566
11,074,494 B2 * 7/2021 Zhao ........................ G06N 3/09
11,119,907 B1 * 9/2021 Gopal ....................... G06F 8/75
11,137,986 B2 * 10/2021 Hu .......................... G06F 8/427
11,151,024 B2 * 10/2021 Hwang ............... G06F 11/3024
11,514,172 B2 * 11/2022 Yamaguchi ........... G06F 21/563
11,599,340 B2 * 3/2023 Assulin ............... G06F 11/3668
11,609,759 B2 * 3/2023 Chandramohan ......... G06F 8/75
11,783,054 B2 * 10/2023 Yamaguchi ............... G06F 8/75 726/1
2004/0230956 A1 * 11/2004 Cirne .................. G06F 11/3612 717/130
2007/0006161 A1 1/2007 Kuester et al.
2008/0320438 A1 * 12/2008 Funto ........................ G06F 8/33 717/106
2009/0307664 A1 * 12/2009 Huuck ................ G06F 11/3608 717/124
2010/0083240 A1 * 4/2010 Siman ................... G06F 16/245 717/144
2013/0167241 A1 * 6/2013 Siman ................... G06F 16/245 726/25
2014/0047538 A1 * 2/2014 Scott ................... H04L 63/1433 726/22
2014/0090070 A1 * 3/2014 Tripp .................... G06F 21/577 726/25
2014/0325472 A1 * 10/2014 Fige .......................... G06F 8/35 717/106
2015/0106939 A1 4/2015 Lietz et al.
2015/0268955 A1 * 9/2015 Mehalingam ............. G06F 8/74 717/123
2017/0171397 A1 6/2017 Mitsumori et al.
2017/0180487 A1 6/2017 Frank et al.
2017/0212829 A1 * 7/2017 Bales ................... G06N 3/0442
2017/0286103 A1 * 10/2017 Caritos, II .......... G06F 11/3604
2018/0004940 A1 * 1/2018 Ha .......................... G06F 21/52
2018/0075348 A1 * 3/2018 Zhao .................... G06N 3/0442
2018/0124092 A1 * 5/2018 Pope ....................... H04L 63/20
2018/0276103 A1 * 9/2018 Woulfe ................... G06F 11/36
2018/0322036 A1 * 11/2018 Alam .................. G06F 11/3688
2018/0336123 A1 * 11/2018 Benes ................. G06F 11/3692
2018/0373507 A1 * 12/2018 Mizrahi .................. G06F 18/24
2019/0138731 A1 * 5/2019 Tan ..................... G06F 11/3612
2019/0354467 A1 * 11/2019 Wiener ............... G06F 11/3688
2020/0089502 A1 * 3/2020 Hong ......................... G06F 8/65
2020/0104492 A1 * 4/2020 Boulton .................... G06F 8/77
2020/0112538 A1 4/2020 Zheng
2020/0125475 A1 * 4/2020 Iyer ........................... G06F 8/75
2020/0125732 A1 * 4/2020 Iyer ..................... G06F 11/3612
2020/0159934 A1 * 5/2020 Yamaguchi ......... G06F 16/9024
2020/0202006 A1 6/2020 Shah et al.
2020/0202007 A1 * 6/2020 Nagaraja ................... G06F 8/71
2021/0042217 A1 * 2/2021 Hwang ............... G06F 11/3604
2021/0049008 A1 * 2/2021 Zhang ....................... G06F 8/75
2021/0056211 A1 * 2/2021 Olson ....................... G06N 5/01
2021/0117550 A1 * 4/2021 Maekawa ........... G06F 12/0223
2021/0182037 A1 * 6/2021 Hu .......................... G06F 8/427
2021/0200862 A1 * 7/2021 Lotspeich ............... G06F 21/54
2021/0240826 A1 * 8/2021 Kutt ........................ G06F 18/24
2021/0397447 A1 12/2021 Crabtree et al.
2022/0027150 A1 * 1/2022 Hotta ........................ G06F 8/75
2022/0283803 A1 * 9/2022 Chandramohan ...... G06N 3/045
2022/0309337 A1 * 9/2022 Copty ................... G06F 21/577
2022/0366056 A1 * 11/2022 Lee ...................... G06F 21/563
2023/0251837 A1 * 8/2023 Drepper .................... G06F 8/41 717/141
2023/0251958 A1 * 8/2023 Vaquier ...................... G06F 8/75 717/124

OTHER PUBLICATIONS

Written Opinion of the Searching Authority for PCT/IB2023/054846, dated Aug. 15, 2023. International Searching Authority Israel Patent Office Jerusalem, Israel.
Extended European Search Report for EP app # 23807125.2, dated Nov. 10, 2025. European Patent Office, Munich, Germany.
Communication pursuant to Article 94(3) EPC for EP application No. 23807125.2, dated Jul. 15, 2026. European Patent Office, Munich, Germany.

* cited by examiner

TECHNIQUES FOR IDENTIFYING AND VALIDATING SECURITY CONTROL STEPS IN SOFTWARE DEVELOPMENT PIPELINES

CROSS-REFERENCE TO RELATED APPLICATIONS

This application is a continuation of U.S. patent application Ser. No. 17/664,315 filed on May 20, 2022, now allowed, the contents of which are hereby incorporated by reference.

TECHNICAL FIELD

The present disclosure relates generally to analyzing software development pipelines, and more specifically to identifying and contextually analyzing steps which act as security control steps in software development pipelines.

BACKGROUND

With the ever-evolving digital transformation businesses, the software development lifecycle has become a crucial component of many successful businesses. While the increased amount of software being utilized promises great improvements in how services are delivered, software development remains a persistent challenge. In particular, due to development velocity rapidly increasing, software is being created and deployed faster than ever, and software development infrastructure must often be expanded rapidly to accommodate. As more software is created, ways to identify and address problems during software development and, more specifically, automated tools to aid in such remediation, are becoming increasingly desirable.

Additionally, due to the large amount of software being created and the significant investments in delivery automation powered by DevOps, complex continuous integration/continuous delivery (CI/CD) pipelines that use on-premises or cloud-native technologies to build, deploy, and control the entire application stack have been adopted. These pipelines can control everything from infrastructure to business logic, and the interactions between components in the software environment can no longer be effectively managed manually by human operators alone. As a result of these issues, security teams in companies are seeing increased business risk and employee burnout. Further, companies face challenges in effectively mitigating risks once security vulnerabilities have been introduced via newly created flawed software.

Within the software development pipeline, various security measures may be implemented. Existing solutions for gatekeeping management typically include manually inserting audit, verification, or control steps in the pipeline based on recommended best practices. However, this process is subject to human error. In particular, human operators often lack visibility into the software development pipeline such that it is difficult to effectively evaluate where security measures are needed. Even when human operators have some visibility into each pipeline, components in various pipelines and the ways in which various pipelines interact may change rapidly as different teams work on their respective pipelines, which makes following and comprehending the pipeline definition impractical at best. As a result, existing solutions often fail to install control steps where such security measures would objectively improve cybersecurity of the pipeline.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term “some embodiments” or “certain embodiments” may be used herein to refer to a single embodiment or multiple embodiments of the disclosure.

Certain embodiments disclosed herein include a method for identifying security control steps in software development pipelines. The method comprises: enumerating a plurality of steps in a software development infrastructure by analyzing software development pipeline data of the software development infrastructure, wherein each step includes a set of computer instructions for performing at least one task; identifying a plurality of step properties for each of the plurality of steps in step data of the step; and classifying at least one of the plurality of steps as a security control step based on the plurality of step properties identified for each of the plurality of steps, wherein each step classified as a security control step includes instructions for at least analyzing code in order to determine whether at least one security requirement is met.

Certain embodiments disclosed herein also include a non-transitory computer readable medium having stored thereon causing a processing circuitry to execute a process, the process comprising: enumerating a plurality of steps in a software development infrastructure by analyzing software development pipeline data of the software development infrastructure, wherein each step includes a set of computer instructions for performing at least one task; identifying a plurality of step properties for each of the plurality of steps in step data of the step; and classifying at least one of the plurality of steps as a security control step based on the plurality of step properties identified for each of the plurality of steps, wherein each step classified as a security control step includes instructions for at least analyzing code in order to determine whether at least one security requirement is met.

Certain embodiments disclosed herein also include a system for identifying security control steps in software development pipelines. The system comprises: a processing circuitry; and a memory, the memory containing instructions that, when executed by the processing circuitry, configure the system to: enumerate a plurality of steps in a software development infrastructure by analyzing software development pipeline data of the software development infrastructure, wherein each step includes a set of computer instructions for performing at least one task; identify a plurality of step properties for each of the plurality of steps in step data of the step; and classify at least one of the plurality of steps as a security control step based on the plurality of step properties identified for each of the plurality of steps, wherein each step classified as a security control step includes instructions for at least analyzing code in order to determine whether at least one security requirement is met.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
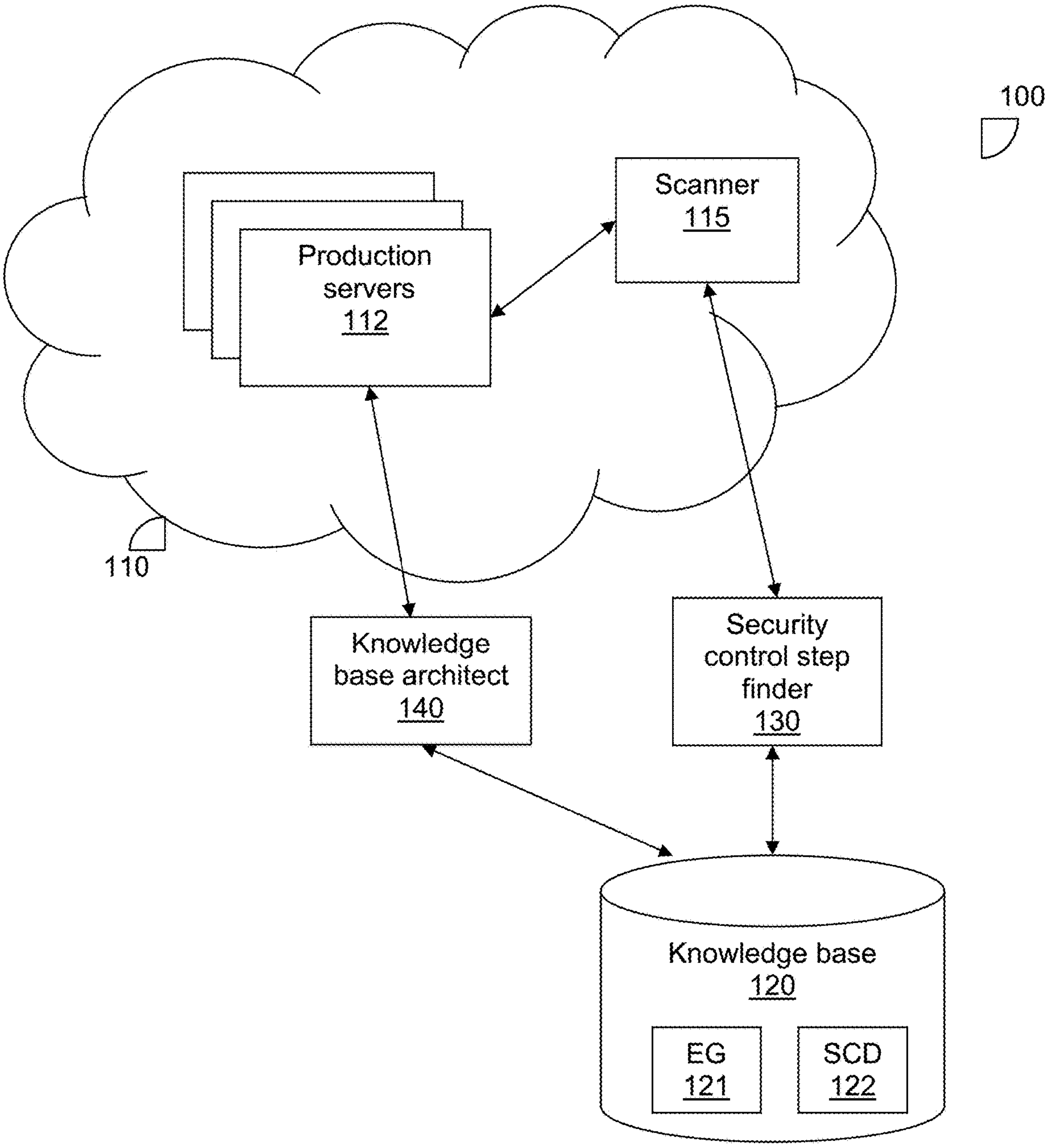
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges in increasingly rapid and complex software development noted above, it has been identified that tools which allow for more visibility into the software development lifecycle can be utilized to allow for automating identification of security control steps in software development pipelines. Specifically, to improve visibility into security control step statuses, techniques for identifying, mapping, and validating security control steps (e.g., sets of instructions which analyze for violations of security requirements) are highly desirable. Moreover, techniques for automatically and accurately generating contextual insights with regard to security control steps within a software development pipeline are also highly desirable. The disclosed embodiments provide various techniques for providing this visibility and vulnerability detection with respect to security control steps in the software development pipeline.

The disclosed embodiments include techniques for identifying and validating security control steps. Using software development pipeline data of one or more pipelines in a software development infrastructure, steps of the pipeline are enumerated. Each step is a set of instructions which collectively define a procedure to be performed in the software development infrastructure. The enumerated steps are classified at least with respect to whether each step acts as a security control step or not. Each security control step performs a task related to securing the software development infrastructure and, in particular, at least for analyzing code or configurations in order to determine whether security requirements are met or violated.

Based on the classification of the steps, a context of each security control step is determined. More specifically, the context is determined based on the deployment of each security control step relative to other components of the software development infrastructure, and may be determine based further on the roles of those other components within the software development infrastructure. The deployment of security control steps within each pipeline or otherwise within the software development infrastructure may be validated based on the context of each security control step and the types of security vulnerabilities the security control step is designed to identify.

Various disclosed embodiments further include techniques for mitigating potential cybersecurity vulnerabilities related to security control steps or lack thereof. When a control step is not successfully validated (e.g., when the control step is deployed within the pipeline in a way that prevents it from accomplishing the task it is intended to perform) or when a control step is absent from a location requiring security measures defined with respect to the software development pipeline (e.g., a location in a mapping of the pipeline that is known to require security measures), a potential vulnerability in the pipeline may be identified. The potential vulnerability may be mitigated, for example by sending a notification directing a software developer to deploy a control step, by installing a control step, by altering the deployment of the control step with respect to the software development pipeline, and the like.

In various disclosed embodiments, a knowledge base may be utilized to enumerate and map steps as well as to retrieve information used for classifying steps. The knowledge base is built to include an entity graph and a semantic concepts dictionary. The knowledge base can be queried with respect to entity-identifying values indicative of entities in the software development infrastructure, semantic concepts identified in cybersecurity event data, or both, in order to identify paths connecting between event logic component entities and software component entities such as, for example, policies which trigger cybersecurity events and software components.

The software components are discrete logical components of the software development infrastructure and may include, but are not limited to, procedures, functions, files, software containers, software layers, repositories, commits, binaries, pipelines, production assets, servers, workloads, databases, security tools (e.g., source code inspection tools, binary inspection tools, runtime environment observation tools, etc.), configuration definitions, scripts, modules, libraries, combinations thereof, portions thereof, and the like. Any of the software components may be contained in discrete hardware components or may be logical components stored on the same hardware component.

In accordance with various disclosed embodiments, the entities may further include steps of the software development pipeline and, in particular, security control steps. Each step is a procedure including a set of instructions for performing a given task or set of tasks. Security control steps perform tasks related to cybersecurity or otherwise relate to quality. Each step is a procedure which has access to a computing environment of the pipeline. Such access may include integrating with third party systems or services. To this end, each step may use one or more functions or other sets of code in order to perform its respective tasks.

In some implementations, the entities in the entity graph may further include nodes representing code owners (e.g., engineers or programmers who wrote or are otherwise responsible for code in any of the software components)

based on predetermined information about the person or people responsible for each code. Such code owner nodes allow for identifying the person responsible for a given portion of the pipeline. This, in turn, allows for accurately and automatically identifying the best person to receive reporting related to security control steps or lack thereof including, but not limited to, maps of the pipeline showing where control steps are deployed within the pipeline, contextual insights for incorporating control steps into the pipeline, and the like. Alternatively or collectively, the entities in the entity graph may further include nodes representing other members of the infrastructure team, the development operations team, or the operations team.

The disclosed embodiments provide visibility into the development operations (DevOps) pipeline of an organization's software development infrastructure and allow for automated or semi-automated identification of security control steps as well as for mitigation of potential cybersecurity vulnerabilities which may be caused by the absence of security control steps in certain locations within the software development pipeline. The entity graph and semantic concepts may be defined with respect to various entities and concepts of the software development life cycle (SDLC) such that the disclosed embodiments may be integrated across the SDLC in order to allow for enforcing policies throughout the SDLC. The disclosed embodiments can be initially utilized during software development in order to identify issues in real-time as software is developed and promoted.

More specifically, the disclosed embodiments allow for mapping steps of the software development infrastructure (e.g., steps within a software development pipeline) with respect to other components of the infrastructure, thereby allowing for defining relative locations of the steps with respect to the software development infrastructure. This, in turn, allows for effectively determining whether a control step is misplaced or otherwise absent where such a security step would normally be used and for determining whether a control step is deployed in a manner that prevents it from achieving its intended purpose. Accordingly, the disclosed embodiments allow for generating insights useful for guiding manual correction of potential security vulnerabilities and/or automatically fixing such vulnerabilities.

The disclosed embodiments provide techniques for analyzing steps including recursively enumerating layers of the software development infrastructure, which in turn allows for understanding the relationships between the components in each layer relative to the overall software development infrastructure and, in particular, the role each step plays within the software development infrastructure. Locations within the software development infrastructure may be defined with respect to discrete portions of the infrastructure enumerated during the recursive enumeration. In this regard, it is noted that some existing solutions categorize steps, but these solutions solely utilize the name of the step and the description of the task performed by that step. However, the name and description alone are often too generic to allow for accurately categorizing the tasks. The disclosed enumeration therefore provides a process which allows for more accurately classifying steps as compared to these existing solutions. The disclosed embodiments also include techniques for semantically analyzing steps (e.g., semantically analyzing arguments, configuration files, portals, etc., used by steps) in order to further improve classification as compared to these existing solutions.

Additionally, the automated identification of control steps made possible by the disclosed embodiments allows for scaling up remediation efforts in a manner that is not feasible using human operators alone. In this regard, it is noted that manual enumeration of steps in the software development pipeline can take human operators exponentially large amounts of time. Thus, it is not practically possible to keep up with the number of remediations that might be necessary in a given development cycle using human operators. Additionally, identifying and mapping control steps as described herein may allow for improving visibility into the cybersecurity status of the pipeline, thereby allowing for detecting potential cybersecurity vulnerabilities related to the lack of control steps with improved accuracy.

FIG. 1 shows an example network diagram 100 utilized to describe the various disclosed embodiments. The example network diagram 100 illustrates a cloud computing platform 110, a knowledge base 120, a security control step finder 130, and a knowledge base architect 140. The cloud computing platform 110 may be realized via one or more networks such as, but not limited to, a wireless, cellular or wired network, a local area network (LAN), a wide area network (WAN), a metro area network (MAN), the Internet, the worldwide web (WWW), similar networks, and any combination thereof.

The cloud computing platform 110 includes production servers 112 and one or more scanners 115. The production servers 112 may be configured to deploy and host web applications uploaded to the cloud computing platform 110 by one or more software developer devices (not shown). The scanners 115 are configured to scan the cloud computing platform 110, binary artifacts, code, combinations thereof, and the like, and are configured to generate cybersecurity event data related to network activity, potential sources of cybersecurity events, intermediate representations of such potential sources, resulting artifacts of the software development process, combinations thereof, and the like. To this end, the scanners 115 may include, but are not limited to, cloud scanners, application security scanners, linting tools, combinations thereof, and any other security validation tools that may be configured to monitor network activities or potential sources of cybersecurity events.

Any cloud scanners among the scanners 115 are configured to monitor for network activities and are configured to generate sources of cybersecurity event data. To this end, such cloud scanners may be configured to monitor network activity and to generate logs of such network activity, or may be configured to monitor suspicious behavior and to generate alerts when such suspicious behavior is identified. The alerts may include information about the events, entities, or both, that triggered the alerts.

The cybersecurity event data included in the cybersecurity event data sources may be provided, for example, in the form of textual data. Such textual data may be analyzed using natural language processing and a semantic concepts dictionary in order to identify entity-identifying values representing specific entities in software development infrastructure which are related to the cybersecurity events, semantic concepts indicating types or other information about entities related to the cybersecurity events, both, and the like.

The knowledge base 120 stores data used for security control step identification and analysis in accordance with various disclosed embodiments. Such data includes, but is not limited to, an entity graph (EG) 121 and a semantic concepts dictionary (SCD) 122. The entity graph 121 is a graph linking nodes representing entity-identifying values of specific entities such as, but not limited to, resource names, unique identifiers, and the like. The semantic concepts dictionary 122 includes definitions of semantic concepts indicating semantic information about entities such as, but not limited to, types of entities (e.g., Docker container, step, etc.).

The entity graph 121 provides an end-to-end view of all domains of the software development infrastructure including connections between components of those domains, thereby establishing potential connections between any two given components in the software development infrastructure and their respective domains. To this end, the entity graph 121 includes schematic data linking different domains and demonstrating linkages within each domain. The domains include domains representing various layers of the software development infrastructure as well as domains representing event logic components (e.g., policies, code defining business logic, queries, etc.) related to cybersecurity events. By graphing domains including both portions of the software development infrastructure and event logic components related to cybersecurity events which may be triggered with respect to the software development infrastructure, the entity graph 121 can be queried in order to determine paths of nodes connecting entities to event logic components, thereby establishing the root cause of any given cybersecurity event as the entity connected to the event logic components related to the cybersecurity event.

In accordance with various disclosed embodiments, the components of the software development infrastructure in the entity graph 121 may include steps mapped with respect to other components of the software development infrastructure as described herein. To this end, in an embodiment, the security control step finder 130 is configured to enumerate steps among the software development infrastructure (e.g., steps used by the production servers 112) and to classify those steps. The enumerated steps may be mapped based on the entities graph 121 and their respective classifications. The entities graph 121 may further include the classifications of the steps mapped therein, and therefore may indicate where steps which act as security control steps are deployed with respect to the software development infrastructure. An example method for identifying and mapping steps is described further below with respect to FIG. 2. An example schematic diagram of the security control step finder 130 is described further below with respect to FIG. 5.

In an embodiment, the knowledge base architect 140 is configured to populate the knowledge base 120 with data to be used by the security control step finder 130 including, but not limited to, the entity graph 121 and the semantic concepts dictionary 122. The knowledge base architect 140 may include, but is not limited to, a processing circuitry and a memory (not shown), where the memory contains instructions that configure the knowledge base architect 140 to populate the knowledge base 120 as described herein when the instructions are executed by the processing circuitry. An example method for creating a knowledge base which may be performed by the knowledge base architect 140 is described further below with respect to FIG. 4.

It should be noted that the example network diagram depicted in FIG. 1 illustrates a particular arrangement of communicating components merely for simplicity purposes, but that the disclosed embodiments are equally applicable to different cloud computing configurations. As a non-limiting example, any of the knowledge base 120, the security control step finder 130, and the knowledge base architect 140 may be deployed in the cloud computing platform 110 without departing from the scope of the disclosure. Additionally, the monitored software may be deployed in an infrastructure other than a cloud computing infrastructure such as, but not limited to, an on-premises infrastructure.

Figure 2:
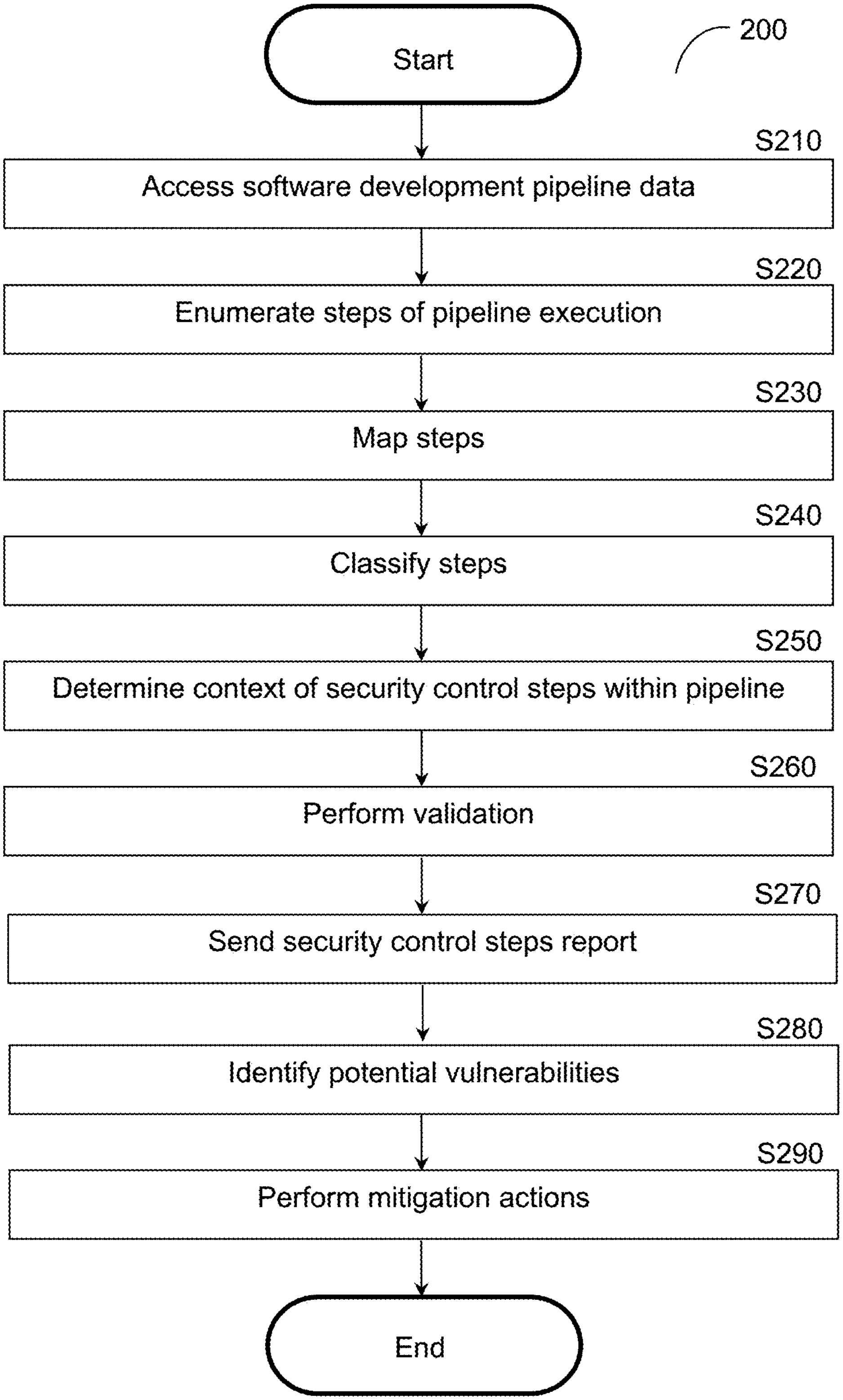
FIG. 2 is a flowchart illustrating a method for identifying security control steps in software development pipelines according to an embodiment.

FIG. 2 is a flowchart 200 illustrating a method for identifying security control steps in software development pipelines according to an embodiment. In an embodiment, the method is performed by the security control step finder 130, FIG. 1.

At S210, software development pipeline data is accessed or otherwise obtained. The software development pipeline data may be, for example, software development lifecycle (SDLC) pipeline data (e.g., data of a continuous integration [CI] and continuous delivery [CD] pipeline). Such SDLC data may include, but is not limited to, a pipeline configuration, a pipeline definition, build scripts and other scripts used in the pipeline (e.g., deployment scripts, validation scripts, testing scripts, etc.), source code, logs, manifests, metadata, combinations thereof, portions thereof, and the like. In some embodiments, the software development pipeline data may be accessed using computing interface permissions provided by an operator of the software development pipeline (e.g., an operator of the cloud computing platform 110, FIG. 1). The accessed software development pipeline may be, but is not limited to, data stored in a source control, data retrieved via an API, data uploaded by a user for analysis, combinations thereof, and the like.

At S220, steps of pipeline execution for one or more software development pipelines are enumerated. Each step is a procedure including a set of instructions (e.g., machine-readable computer instructions) for performing one or more respective tasks. In this regard, it is noted that a given software development pipeline includes one or more software components in a computing environment which may be accessed via procedures. Thus, the steps are enumerated such that the procedures used to access different components of the software development infrastructure within the pipeline can be identified and analyzed.

In an embodiment, S220 includes analyzing the logs, manifests, and metadata of the software development pipeline data. In a further embodiment, S220 may include performing a recursive enumeration that starts with a top-level identifier for a service (e.g., an organization identifier of an organization that owns or operates the service to be built using the software development pipeline). The recursive enumeration includes identifying, using data accessed via computing interfaces, components within the service in layers, with data related to components in one layer being used to enumerate components in the next layers. In other words, portions of the software development infrastructure are iteratively enumerated in multiple iterations by enumerating components within each layer of the software development infrastructure at each iteration. During this recursive enumeration, pipelines may be identified and then steps within the pipeline may be enumerated.

In this regard, it is noted that a software development infrastructure typically includes various logical components that encapsulate different aspects of the software development infrastructure with varying granularities. In other words, some aspects include others in a layered manner. As a non-limiting example, a top-level software development service (top layer/layer 1) to be built may include projects and repositories (layer 2), where each project includes one or more pipelines (layer 3), each pipeline includes jobs (layer 4), and each job utilizes one or more steps (layer 5). The sub-components of each logical component are reflected in the logs, manifests, and metadata of the software development infrastructure (i.e., the software development pipeline data accessed at S210) such that these sub-components can be identified, thereby enumerating components in each layer and ultimately enumerating steps in one of the layers. Further, relationships between and among these components and sub-components can be unearthed through this recursive enumeration.

To this end, in a further embodiment, S220 includes recursively enumerating all of the projects and repositories under the top-level identifier of a software development service using computing interfaces of the pipeline (e.g., using the provided computer interface permissions). For each project enumerated this way, the computing interfaces are used to enumerate all of the pipelines of the project, then the jobs of each pipeline, and finally the steps taken in each job's run. The result is a complete enumeration of all steps used for pipeline execution of software development pipelines within the software development infrastructure.

In another embodiment, one or more of the steps may be identified imperatively by analyzing different types of objects in the software development infrastructure. This imperative analysis may be performed when the types of objects differ between layers, i.e., when different layers include different types of objects such that layers can be distinguished based on the types of objects included therein. Thus, in such an embodiment, objects in the software development infrastructure may be enumerated without recursively enumerating layers, and relationships between and among components can be determined with respect to layers based on the types of components.

Alternatively or in addition, steps may be identified based on triggers between pipelines. More specifically, connections between components of different pipelines may be identified based on execution of a first pipeline triggering a second pipeline's execution. When there is a software dependency between a component built by the first pipeline and a component built by the second pipeline, execution of the first pipeline results in execution of the second pipeline when the component of the first pipeline calls the component of the second pipeline. In such a case, recursive analysis of the first pipeline may proceed into analyzing the second pipeline, thereby completing the analysis of the entire process starting with the first pipeline and resulting in execution of the second pipeline.

At S230, the enumerated steps are mapped with respect to components of a software development infrastructure in order to create a mapping that includes the relative locations of steps within the software development pipeline. In various embodiments, the steps are mapped at least with respect to each other within the pipeline.

The relative location of a given step with respect to other components of the software development infrastructure is defined at least with respect to connections between and among components of the software development infrastructure, and may further be defined with respect to order of processing related to those connections.

The connections may include passing arguments, passing outputs, and the like, from one component to another (e.g., from one step to another), or otherwise based on the use of the results of one component by another component. As a non-limiting example, a connection may be defined as artifacts built by one step being scanned by another step or arguments used by one step being passed to another step.

The order may be based on the flow of data between the connected steps, e.g., data output or processed by a first step in a given order may be subsequently passed to or processed by a second step that is identified as being later in the order. As a non-limiting example, code created at one step may be analyzed by another step. As another non-limiting example, code scanned at one step may be deployed in another step.

In at least some embodiments, the steps are mapped with respect to an entity graph indicating entities and connections between entities in the software development or SDLC pipeline. In a further embodiment, the entity graph may be part of a knowledge based constructed, for example, as described below with respect to FIG. 4. Creating entity graphs and knowledge bases for software development pipelines are described further in U.S. patent application Ser. No. 17/507,180, assigned to the common assignee, the contents of which are hereby incorporated by reference. The knowledge graph may further include step data associated with each mapped step which may be indicative of various properties of the mapped steps, and can therefore be queried for this step data.

At S240, the enumerated steps are classified. The classification is based on step properties of each step such as, but not limited to, provider, type, name, arguments, combinations thereof, and the like. In some embodiments, S240 further includes normalizing the step data which may indicate such step properties. Further, S240 may also include parsing and interpreting text of arguments in order to semantically analyze the arguments used by those steps, thereby improving the classification as compared to solutions which categorize steps based solely on name and/or task descriptions.

Figure 3:
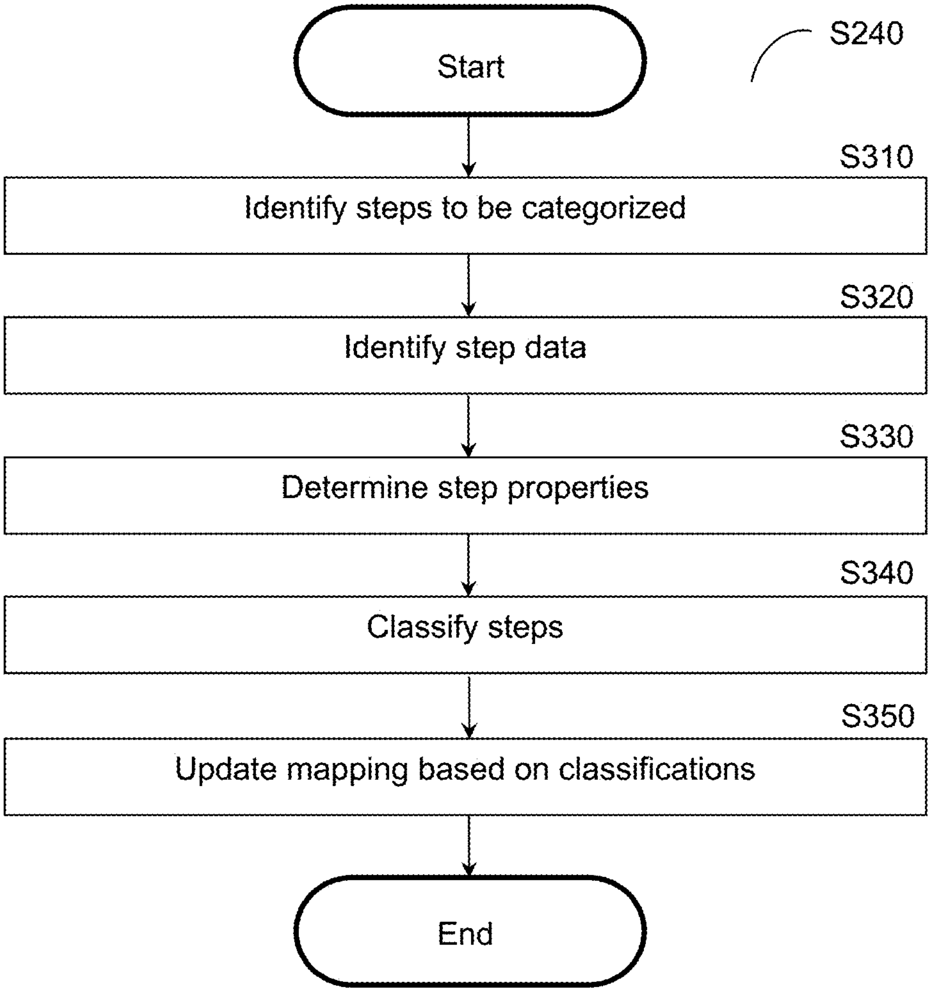
FIG. 3 is a flowchart illustrating a method for categorizing steps in a software development pipeline according to an embodiment.

In an embodiment, the steps are classified as now described with respect to FIG. 3. FIG. 3 is a flowchart S240 illustrating a method for classifying steps in a software development pipeline according to an embodiment.

At S310, steps to be classified are identified. The steps to be classified may include the steps enumerated, for example, as discussed above with respect to S220. The steps may further be identified with respect to a mapping including representations of the steps (e.g., as nodes in the mapping). Such a mapping may include an entity graph (e.g., the entity graph 121, FIG. 1), and S310 may further include identifying this entity graph and/or mapping.

At S320, step data for the identified steps is identified. The step data may be retrieved, for example, from an entity graph (e.g., the entity graph 121, FIG. 1) or otherwise from a knowledge base including data related to each step.

In an embodiment, S320 further includes normalizing the identified step data into a unified format such that step data from different CI/CD services or otherwise from different sources of data are normalized into the same format. The unified format may include fields and values, where each value is inserted into a corresponding field. As a non-limiting example, the textual value "securityGatekeeper1" may correspond to a "name" field in the unified format. The applicable field for each value may be determined by analyzing the value, the structure of data including the value in the original data (e.g., text of a field of the original data may be used to determine an appropriate field for the unified format), combinations thereof, and the like.

Normalizing the step data may further improve the mapping of the steps. More specifically, the mapping of steps may be represented in an entity graph including step data for each of the steps represented therein. Subsequent querying of the entity graph having the normalized step data is improved as compared to non-normalized step data.

In some embodiments, S320 may further include analyzing a script of one or more of the steps in order to obtain more data about the step type. More specifically, when a step is a custom type of step rather than a publicly available step (e.g., a step available on a public marketplace), a script of the step may be extracted for further analysis.

In an embodiment, S320 further includes parsing and interpreting arguments in the step data. Each argument is a value that is passed to another program, step, or function when a step is executed. Each argument including textual values may be semantically analyzed, for example, using a predetermined definitions database, by applying rules defined using relative placement of words relative to each other, and the like. The semantic analysis may be utilized to identify the context of the words in each argument, thereby obtaining more information which may be utilized to determine properties of the steps or otherwise to more accurately classify the steps.

In a further embodiment, the arguments may be inspected in order to extract paths to resources used by the arguments and to analyze the extracted paths in order to identify locations of those resources. The locations of the resources may be accessed in order to access the resources, and the resources may be analyzed. The analysis of the resources may likewise include, but is not limited to, semantically analyzing text contained in the resources.

As a non-limiting example where an argument points to a configuration file in a codebase from which a step reads its rules, the argument is inspected in order to extract the path, and the extracted path is analyzed to identify a location of the configuration file. The configuration file is accessed at that location, and the contents of the configuration file are analyzed. The results of this analysis may be used to identify step properties, classify the steps, or both.

In another embodiment, S320 may further include obtaining remotely stored step data for one or more of the steps (e.g., data stored outside of the software development infrastructure being analyzed). In such an embodiment, the remotely stored step data may be obtained using a key discovered during analysis of the software infrastructure. Alternatively or in combination, some or all of the remotely stored step data may be obtained via a third party service (e.g., by sending a request to such a service for which access has been granted to the system performing the method of FIG. 3).

As a non-limiting example, the step is a command line input (CLI) command that obtains an API key (e.g., via an argument, an environment variable, or a configuration file) where the configuration data of the step is stored remotely. In such an example, a user may integrate the process performing the method of FIG. 3 with a third party service through which the configuration data is accessible, and the configuration data may be retrieved via the third party service.

In this regard, it is noted that the arguments may not fully contain all of the semantic information required to accurately determine the role of a step for classification purposes. Analyzing the arguments and the paths represented in those arguments allows for realizing additional contextual information about a step, thereby further improving the accuracy of the resulting classification of the step. Further, when at least a portion of the step data for a given step is not contained locally, accessing such remote step data allows for obtaining additional information useful for improving classification of the step.

At S330, step properties are identified within the step data. When the step data is normalized into a unified format, the step properties may be identified as values within fields of the unified format representing respective step properties.

At S340, the steps are classified based on the determined step properties. In an embodiment, steps are classified as either security control steps or not security control steps. In a further embodiment, the steps may also be classified into categories of processes used by the pipeline. Alternatively, steps may be classified as security control steps, not security control steps, or unknown. In some implementations, the classifications may be realized as likelihoods that the step falls into a given class (e.g., a likelihood that the step is a security control step or a likelihood that the step falls into a particular type of security control step).

In an embodiment, each security control step is a step which performs one or more tasks related to security. Security-related tasks may include tasks used as part of a process which includes analyzing portions of the pipeline (e.g., analyzing code) in order to identify potential security issues. In a further embodiment, the steps classified as security control steps include only steps which scan or otherwise analyze code as part of one or more code analysis tasks and excludes steps which do not perform code analysis tasks. In such an embodiment, security control steps may generally be steps which determine whether security requirements are met or otherwise analyze code in order to check for potential vulnerabilities.

In another embodiment, the classification is at least partially based on the entity graph. More specifically, steps may be mapped with respect to portions of the entity graph representing parts of the pipeline related to different categories of processes included amongst the pipeline. Each step may therefore be classified into a category of the portion of the entity graph to which the step is mapped. Such categories may include, but are not limited to, security, source code fetching, artifact building, and the like. In other words, steps may be further classified into categories with respect to the purposes they serve within the pipeline.

At optional S350, a mapping may be updated based on the classification. As a non-limiting example, an entity graph may be updated to include the steps or an entity graph including the steps may be updated to include the classifications of each step as data associated with the step to be used for future reference (e.g., to generate insights for other steps with respect to steps in the mapping).

Returning to FIG. 2, at S250, a context of each security control step within the pipeline is determined. In an embodiment, the context is determined based on the mapping between components of the software development infrastructure and a role of the security control step relative to other software components and, in particular, other steps. The role of a security control step may be defined with respect to the types of components or specific components analyzed using the instructions of the security control step. As a non-limiting example, a security control step including instructions for scanning artifacts has a role of scanning artifacts such that a relevant context for that security control step is defined with respect to other steps which build artifacts.

In a further embodiment, the context is determined based at least on the connections between components and the order among connected components. As a non-limiting example, the context for a security control step designed to scan code may be determined based on a location of a step deploying the code relative to the security control step which scans that code.

In an embodiment, the context of the security control steps is determined based on other components in a mapping (e.g., the mapping as determined at S240, which may be incorporated into an entity graph such as the entity graph 121, FIG. 1). To this end, in such an embodiment, S250 may include querying the entity graph including the mapped security control steps as entities represented by nodes in the graph.

The query may be generated based on a predetermined query language. Such a query language may be designed for the purpose of harnessing logical deduction rules for querying entity graphs or relational databases in order to obtain relevant information for development, security, and operations for the various domains of a software development infrastructure. Alternatively, the query may be generated in a general purpose query language. In some implementations, the query language may be custom-defined to allow for customization of queries for a specific environment (e.g., a cloud environment used by a specific company) in a manner that can scale up to different stacks.

At S260, validation is performed based on the determined contexts in order to determine whether security control steps are deployed correctly. Performing the validation may include, but is not limited to, confirming whether security control steps are deployed effectively, determining whether any security control steps that would be expected in a given location relative to the software development pipeline are absent, both, and the like. To this end, S260 may include applying validation rules which define expected deployments of security control steps or otherwise defines how security control steps should be deployed.

More specifically, the validation rules may define requirements for security control steps with respect to other components in the software development infrastructure such that the validation is performed based on the relative locations of security control steps within the pipeline, the absence of security control steps at certain locations relative to the pipeline, or both. Additionally, the validation may be performed further with respect to classifications of other steps such that the validation rules take into account the relative placement of the security control steps with respect to other steps based on the roles played by those other steps (e.g., roles such as source code fetching, artifact building, etc.). To this end, the validation rules may be defined further with respect to the types of code that different security control steps are designed to protect, which may be determined by analyzing the step data as discussed above.

When the vulnerability rules include rules for identifying the incorrect deployment of security control steps, the vulnerability rules may define expected relationships between components in the pipeline relative to their locations within the pipeline. More specifically, in an embodiment, each security control step is a procedure including a set of instructions for performing one or more security-related tasks. In a further embodiment, each security control step includes instructions for scanning, comparing, or otherwise analyzing code or configurations in the software development infrastructure. In yet a further embodiment, the security control steps may exclude steps related to security which do not involve analyzing code (e.g., steps for initializing code or other steps which may be needed for analysis but do not actually involve analysis). In other words, in such an embodiment, the security control steps may be defined to include only steps which include instructions for analyzing code in the software development infrastructure.

As a non-limiting example for a vulnerability rule defined with respect to the incorrect deployment of a security control step, the vulnerability rules for security control steps intended to protect may define a vulnerability as occurring when a security control step in an artifact-building portion of the software development infrastructure is deployed such that the pipeline containing the security control step builds artifacts after the security control step is applied (e.g., after code has been analyzed as part of that step). When a security control step is deployed such that more artifacts are created in the same pipeline after the security control step is applied, a vulnerability may be detected.

When the vulnerability rules include rules for identifying the absence of expected security control steps, the vulnerability rules may define locations within the pipeline where security control steps are expected. These locations may be defined with respect to, for example, other steps in the same pipeline as the security control step or in other portions of the software development infrastructure. To this end, in such an embodiment, S260 may include identifying an absence of an expected security control step (e.g., expected for a given location relative to other components of the software development infrastructure) based on the context of each security control step, for example by determining whether the context of any of the security control steps indicates that the step is deployed at the expected location.

As a non-limiting example for a vulnerability rule defined with respect to the absence of a security control step, the vulnerability rules may define a vulnerability as occurring when a security control step is not deployed after one or more steps that result in creating new artifacts. When no security control step is deployed in order to analyze the artifacts created by the artifact-building steps, a vulnerability may be detected.

At S270, a security control steps report is sent. The report may include, but is not limited to, data indicating the results of the validation, one or more contextual insights related to security control steps or lack thereof within the software development pipeline, a visual representation of the mapping or other organization of the software development infrastructure showing relative locations of steps (and, in particular, security control steps) relative to other components of the software development infrastructure, combinations thereof, and the like.

At optional S280, one or more potential vulnerabilities in the software pipeline are identified with respect to security control steps or lack thereof. In an embodiment, vulnerabilities may be identified based on the results of applying the vulnerability rules. More specifically, the vulnerabilities may include, but are not limited to, the absence of a security control step at an expected location, the presence of a security control step at a location relative to certain other components of the software development infrastructure (e.g., others steps having certain classifications) that is inconsistent with proper deployment of the security control step, and the like.

At optional S290, one or more mitigation actions may be performed with respect to the identified vulnerabilities. The mitigation actions may include, but are not limited to, changing configurations of software components, changing code of software components, installing or otherwise deploying software components (e.g., installing a security control step), redeploying a security control step (e.g., deploying the security control step at a different location than a current location of that step), combinations thereof, and the like. When the mitigation actions include installing a security control step or redeploying the security control step, such installation or deployment may be performed based on the mapping performed at S240.

When the mitigation actions include generating a notification, S290 may further include determining to which person the notification should be sent. In implementations where the entity graph in which the steps are mapped includes nodes representing code owners, such person to which the notification should be sent may be a person, team, business unit, and the like, represented by a node linked to the step in the entity graph. Accordingly, an appropriate person to investigate or fix an issue can be automatically and accurately identified.

Figure 4:
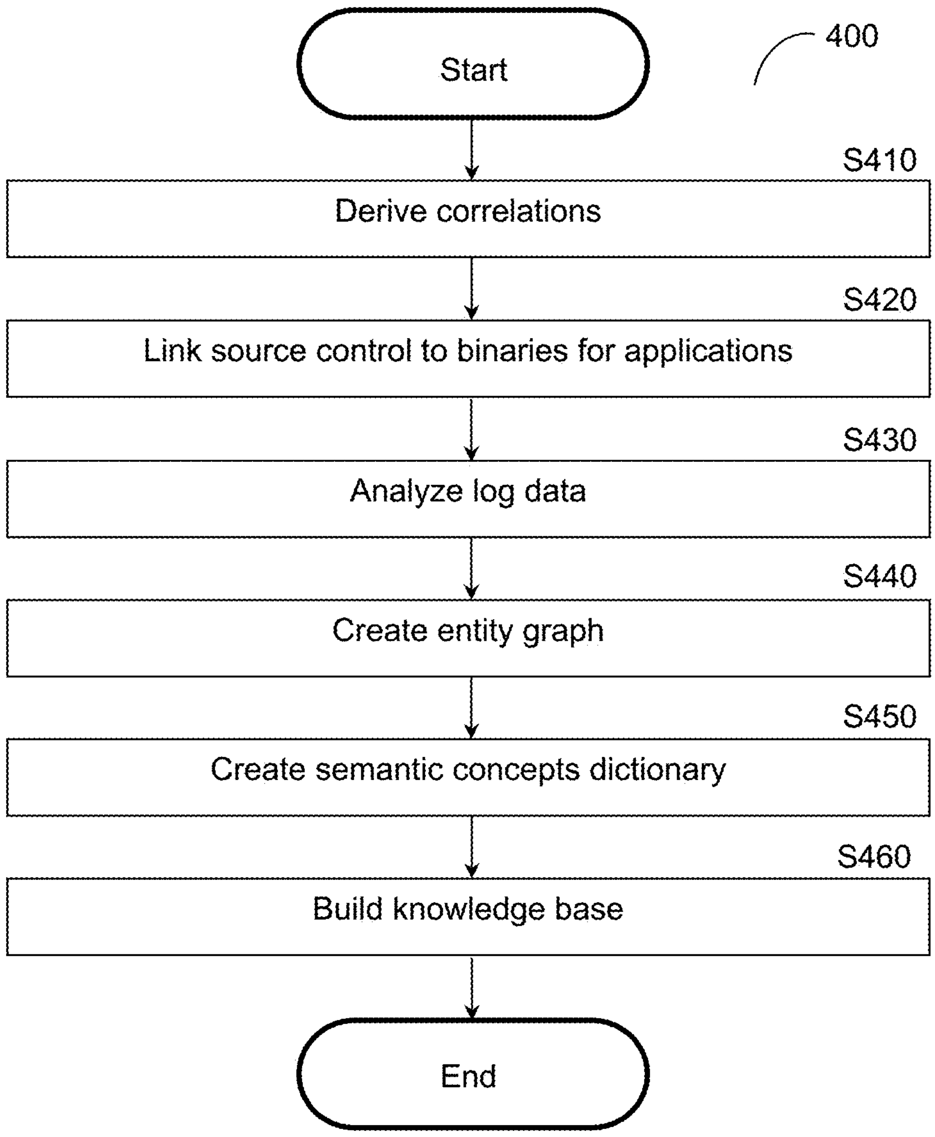
FIG. 4 is a flowchart illustrating a method for creating a knowledge base of semantic concepts and infrastructure values according to an embodiment.

FIG. 4 is a flowchart 400 illustrating a method for creating a knowledge base of semantic concepts and entity-identifying values according to an embodiment. In an embodiment, the method is performed by the knowledge base architect 140, FIG. 1.

At S410, correlations between software components are derived by analyzing software development lifecycle (SDLC) pipeline data (e.g., data of a continuous integration [CI] and continuous delivery [CD] pipeline). Such SDLC data may include, but is not limited to, a pipeline configuration, build scripts, source code, combinations thereof, portions thereof, and the like. The correlations are identified based on references between software components indicated in such data, static analysis of software components, semantic analysis of text related to the software components, combinations thereof, and the like.

In an embodiment, the semantic analysis may include extracting semantic keywords from textual content included in cybersecurity event data related to the pipeline (e.g., event data generated by one or more scanners such as the scanner 115, FIG. 1). Such textual content may include, but is not limited to, text of an alert or log, text of a policy or other event logic component linked to a cybersecurity event (e.g., code defining detection logic used to detect the cybersecurity event, a query which resulted in the alert triggering, etc.), a machine readable representation of an alert (e.g., a JSON or XML representation of the alert), combinations thereof, and the like. To this end, in a further embodiment, S410 may include performing natural language processing on such text in order to identify known semantic concepts (e.g., semantic concepts defined in a semantic concepts dictionary) and to extract the identified semantic concepts.

At S420, source control is linked to binaries of one or more applications based on the derived correlations. In an embodiment, S420 includes extracting uniquely identifying features of the source control artifact and binaries from the analyzed data. In a further embodiment, the linking is limited to pairs of binaries and source control artifacts selected from limited set of binaries and source control artifacts, respectively.

At S430, log data (e.g., log files) is analyzed for additional correlations. To this end, S430 may include identifying actions taken by software components and events which may be caused by those actions. These relationships may be identified based on circumstances such as, but not limited to, events occurring shortly after those actions, determinations that events which could logically have been caused by the actions, combinations thereof, and the like. The identification of S430 may be based on probabilistic analysis such that, for example, correlations having likelihoods above a threshold are identified.

As a non-limiting example, by analyzing log files from an integration or deployment server, links between code commits and binary hashes (and, consequently, the corresponding entities involved) may be identified. As another non-limiting example, by analyzing of files in a cloud environment, information identifying entities used by automation engines may be identified.

In this regard, it has been identified that correlations indicated between log files can demonstrate that particular deployments occurred previously, which in turn aids in providing visibility to the DevOps pipeline in situations where static analysis will not satisfy the constraints, and may further aid in finding hidden automation. This, in turn, provides additional information about relationships between software components and entity logic components which can be utilized in some non-limiting examples to more accurately identify root causes as discussed above with respect to FIG. 2.

At S440, an entity graph is created based on the correlations identified at S410 through S430. The entity graph includes nodes and edges. The nodes represent distinct logical entities such as, but not limited to, software components, event logic components, and the like. The edges connect entities based on the correlations identified at S410 through S430. The edges therefore represent relationships between pairs of entities, which in turn form paths as one navigates from a first entity to a second, from the second to a third, and so on. The paths following edges between nodes may therefore be utilized to identify connections between different entities (e.g., between event logic components and software components), thereby allowing for automatically and objectively identifying root causes of cybersecurity events.

In some embodiments, S440 further includes incorporating translated entity-defining datasets into the entity graph. To this end, in such embodiments, S440 includes embedding translated data into the entity graph, and S440 may further include performing such translation. The entity-defining datasets provide explicit definitions of features of potential entities to be included in the entity graph. As a non-limiting example, such a dataset may be a schema of a DevOps tool (e.g., Terraform) that defines the function performed by each portion of the tool. Further incorporating such explicitly-defined features allows for further increasing the granularity of the graph, thereby further improving applications of said graph in identifying connections between cybersecurity event data and event logic components.

At S450, a semantic concepts dictionary is created. The semantic concepts dictionary may be populated with predetermined semantic concepts. The semantic concepts indicate potential characteristics of entities in the entity graph such as, but not limited to, type (e.g., "Docker container"), potential identifiers (e.g., an Internet Protocol address), build automation, configuration, portions thereof, combinations thereof, and the like. Such semantic concepts provide additional information regarding entities which may be used to improve the accuracy of root cause identification by providing additional identifying data for entities that can be queried. These semantic concepts indicating potential characteristics of entities may be included as nodes in the entity graph, or may be included in data of nodes of the entity graph.

At S460, a knowledge base is built. The knowledge base includes the entity graph and the semantic concepts dictionary.

Once built, the knowledge base can be queried as described herein (for example, as discussed with respect to FIGS. 2 and 3) in order to determine connections between software components in the software development pipeline and, more specifically, to map steps of the software development pipeline with respect to other components reflected in the knowledge base.

It should be noted that the steps of FIG. 4 are depicted in a particular order, but that the steps are not necessarily limited to the order depicted. As a non-limiting example, the semantic concepts dictionary may be created before or in parallel with any of the steps S410 through S440 without departing from the scope of the disclosure.

Figure 5:
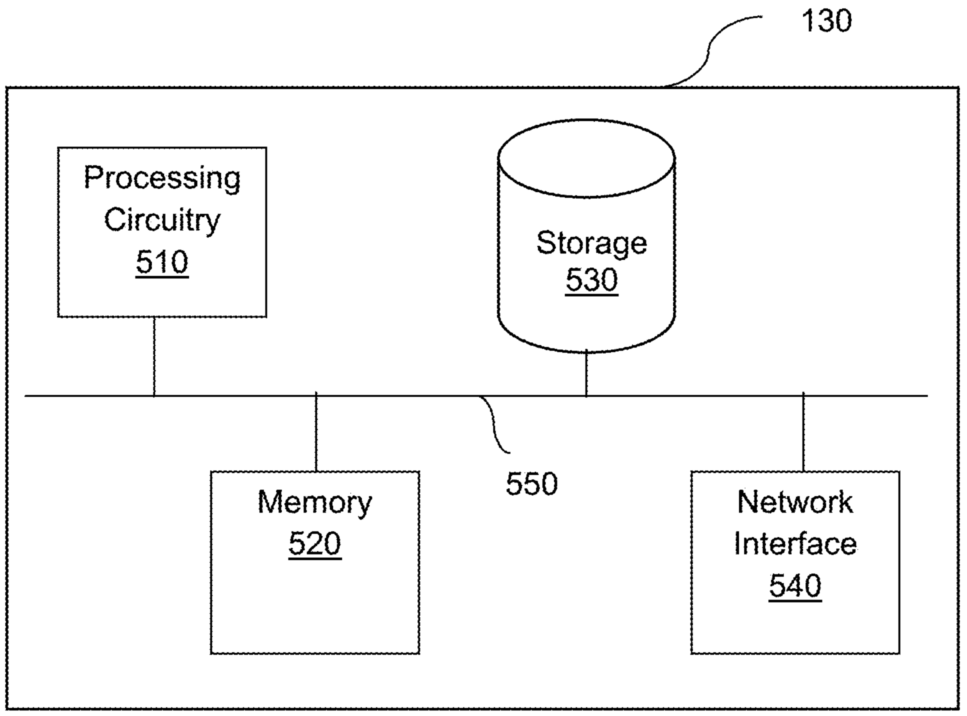
FIG. 5 is a schematic diagram of a security control step finder according to an embodiment.

FIG. 5 is an example schematic diagram of a security control step finder 130 according to an embodiment. The security control step finder 130 includes a processing circuitry 510 coupled to a memory 520, a storage 530, and a network interface 540. In an embodiment, the components of the security control step finder 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the security control step finder 130 to communicate with, for example, the scanner 115, the knowledge base 120, both, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identifying security control steps in software development pipelines, comprising:

enumerating a plurality of steps in a software development infrastructure by analyzing software development pipeline data of the software development infrastructure, wherein each step includes a set of computer instructions for performing at least one task;

identifying a plurality of step properties for each of the plurality of steps in step data of the step;

classifying at least one first step of the plurality of steps as a security control step based on the plurality of step properties identified for each of the plurality of steps, wherein each of the at least one first step includes instructions for at least analyzing code in order to determine whether at least one security requirement is met;

determining a context of each of the at least one first step with respect to other components of the software development infrastructure;

identifying an absence of an expected security control step within the software development infrastructure based on the context determined for each of the at least one first step; and installing at least one new security control step in the software development infrastructure based on the identified absence of an expected security control step.

2. The method of claim 1, wherein the software development infrastructure includes a plurality of layers, wherein the plurality of steps is enumerated recursively, wherein recursively enumerating portions of the software development infrastructure includes iteratively enumerating components within one of the plurality of layers in a plurality of iterations.

3. The method of claim 1, further comprising:
determining at least one incorrectly deployed step among the at least one first step based on the context of each of the at least one first step, wherein one of the at least one first step is correctly deployed when the context of the first step indicates that the security control step is deployed in a location of the software development infrastructure matching an expected location with respect to components of the software development infrastructure;
detecting a vulnerability in the software development infrastructure based on the determined at least one incorrectly deployed step; and
mitigating the detected vulnerability, wherein mitigating the detected vulnerability further comprises redeploying at least a portion of the at least one incorrectly deployed step.

4. The method of claim 1, further comprising:
detecting a vulnerability in the software development infrastructure based on the context determined for each security control step; and
performing at least one mitigation action with respect to the detected vulnerability.

5. The method of claim 1, further comprising:
detecting a vulnerability in the software development infrastructure based on a deployment of the at least one first step; and
performing at least one mitigation action in order to mitigate the detected vulnerability, wherein the at least one mitigation action includes deploying at least one new security control step.

6. The method of claim 1, further comprising:
updating an entity graph having a plurality of nodes representing respective entities of a plurality of entities, wherein each of the plurality of entities corresponds to a respective component among a plurality of components of the software development infrastructure, wherein the plurality of components of the software development infrastructure include the enumerated plurality of steps, wherein the entity graph is updated to include the nodes representing respective steps of the enumerated plurality of steps.

7. The method of claim 1, further comprising:
creating a semantic concepts dictionary, wherein the semantic concepts dictionary defines a plurality of semantic concepts describing potential characteristics of components of the software development infrastructure;
creating an entity graph based on a plurality of correlations identified between entities of a plurality of entities, wherein each of the plurality of entities corresponds to one of the components of the software development infrastructure; and
building a knowledge base using the semantic concepts dictionary and the entity graph, wherein at least a portion of the step data for the plurality of steps is retrieved from the knowledge base.

8. A non-transitory computer readable medium having stored thereon instructions for causing a processing circuitry to execute a process, the process comprising:
enumerating a plurality of steps in a software development infrastructure by analyzing software development pipeline data of the software development infrastructure, wherein each step includes a set of computer instructions for performing at least one task;
identifying a plurality of step properties for each of the plurality of steps in step data of the step;
classifying at least one first step of the plurality of steps as a security control step based on the plurality of step properties identified for each of the plurality of steps, wherein each of the at least one first step includes instructions for at least analyzing code in order to determine whether at least one security requirement is met;
determining a context of each of the at least one first step with respect to other components of the software development infrastructure;
identifying an absence of an expected security control step within the software development infrastructure based on the context determined for each of the at least one first step; and
installing at least one new security control step in the software development infrastructure based on the identified absence of an expected security control step.

9. A system for identifying security control steps in software development pipelines, comprising:
a processing circuitry; and
a memory, the memory containing instructions that, when executed by the processing circuitry, configure the system to:
enumerate a plurality of steps in a software development infrastructure by analyzing software development pipeline data of the software development infrastructure, wherein each step includes a set of computer instructions for performing at least one task;
identify a plurality of step properties for each of the plurality of steps in step data of the step;
classify at least one first step of the plurality of steps as a security control step based on the plurality of step properties identified for each of the plurality of steps, wherein each of the at least one first step includes instructions for at least analyzing code in order to determine whether at least one security requirement is met;
determine a context of each of the at least one first step with respect to other components of the software development infrastructure;
identify an absence of an expected security control step within the software development infrastructure based on the context determined for each of the at least one first step; and
install at least one new security control step in the software development infrastructure based on the identified absence of an expected security control step.

10. The system of claim 9, wherein the software development infrastructure includes a plurality of layers, wherein the plurality of steps is enumerated recursively, wherein recursively enumerating portions of the software development infrastructure includes iteratively enumerating components within one of the plurality of layers in a plurality of iterations.

11. The system of claim 9, wherein the system is further configured to:
determine at least one incorrectly deployed step among the at least one first step based on the context of each of the at least one first step, wherein one of the at least one first step is correctly deployed when the context of the first step indicates that the security control step is deployed in a location of the software development infrastructure matching an expected location with respect to components of the software development infrastructure;

detect a vulnerability in the software development infrastructure based on the determined at least one incorrectly deployed step; and mitigate the detected vulnerability, wherein mitigating the detected vulnerability further comprises redeploying at least a portion of the at least one incorrectly deployed step.

12. The system of claim 9, wherein the system is further configured to:

detect a vulnerability in the software development infrastructure based on the context determined for each security control step; and perform at least one mitigation action with respect to the detected vulnerability.

13. The system of claim 9, wherein the system is further configured to:

detect a vulnerability in the software development infrastructure based on a deployment of the at least one first step; and perform at least one mitigation action in order to mitigate the detected vulnerability, wherein the at least one mitigation action includes deploying at least one new security control step.

14. The system of claim 9, wherein the system is further configured to:

update an entity graph having a plurality of nodes representing respective entities of a plurality of entities, wherein each of the plurality of entities corresponds to a respective component among a plurality of components of the software development infrastructure, wherein the plurality of components of the software development infrastructure include the enumerated plurality of steps, wherein the entity graph is updated to include the nodes representing respective steps of the enumerated plurality of steps.

15. The system of claim 9, wherein the system is further configured to:

create a semantic concepts dictionary, wherein the semantic concepts dictionary defines a plurality of semantic concepts describing potential characteristics of components of the software development infrastructure;

create an entity graph based on a plurality of correlations identified between entities of a plurality of entities, wherein each of the plurality of entities corresponds to one of the components of the software development infrastructure; and build a knowledge base using the semantic concepts dictionary and the entity graph, wherein at least a portion of the step data for the plurality of steps is retrieved from the knowledge base.

* * * * *